Patented Aug. 31, 1943

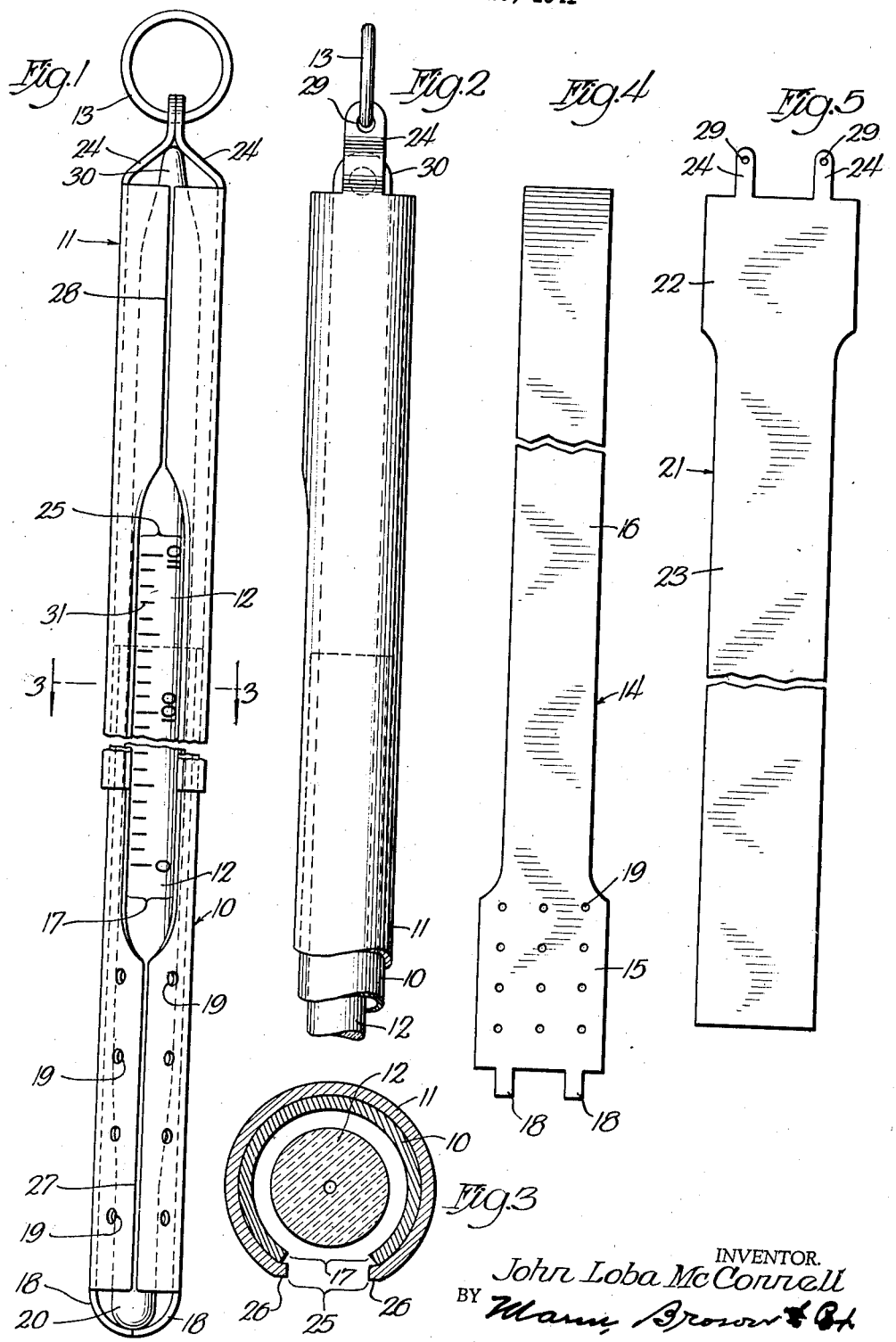

2,328,528

UNITED STATES PATENT OFFICE 2,328,528

THERMOMETER ARMOR

John Loba McConnell, Evanston, Ill., assignor to Central Scientific Co., a corporation of Illinois Application November 28, 1941, Serial No. 420,753

11 Claims. (Cl. 73—374)

This invention relates to protective metal casings or armor for the ordinary thermometer of the mercury or other liquid in glass type such as are commonly used in laboratories. The present forms of thermometer armor are of fixed length so that it is necessary to provide armor of different lengths for thermometers of different lengths, thus making it necessary for scientific apparatus supply companies to manufacture and stock a multiplicity of different thermometer armors in order to provide armor for thermometers having different ranges.

The principal object of this invention is to provide a thermometer armor which is simple in construction and is adjustable in length so that a single form of armor may be used for thermometers of different lengths for measuring different ranges of temperature. Another object of this invention is to provide a thermometer armor which can be manufactured from flat sheet stock by simple forming operations.

Another object of this invention is to provide a thermometer armor which will receive a common type of laboratory thermometer, having a small ring formed at its upper end, and which will engage the thermometer in such a way as to prevent it from rotating in the armor, thus insuring that the thermometer is always in a position to be read through the slot provided for this purpose in the armor.

Other objects and advantages of the invention will be apparent from the following description and the accompanying drawing, in which Fig. 1 is a face view of one of the preferred forms of the invention, complete with a thermometer within it, and with about half of its length broken out in order that the details of the construction may be shown on a larger scale;

Fig. 2 is a side view of the upper portion of the form of the invention shown in Fig. 1;

Fig. 3 is a cross section taken on the line 3—3 of Fig. 1 and looking in the direction of the arrows;

Fig. 4 is a plan view, on a smaller scale, of the blank for forming one of the principal parts of the form of the invention shown in Figs. 1 to 3; and Fig. 5 is a plan view, on the same scale as Fig. 4, of the blank for forming the other principal part of the form of the invention shown in Figs. 1 to 3.

The particular embodiment of the invention shown in the drawing consists of an inner tube 10 and an outer tube 11, which enclose a thermometer 12, and a ring 13 by which the entire assembly may be suspended.

The inner tube 10 is formed from a blank 14, having the shape shown in Fig. 4. One end 15 of the blank has a width which is slightly less than the circumference of the finished tube 10, while the remainder 16 of the blank has a width which is equal to the circumference of the finished tube, less the width of the slot 17 through which a thermometer is read. The wide end 15 of the blank is provided with a pair of longitudinally projecting lugs 18 spaced apart so that, when the blank 14 is rolled into a tube, the lugs 18 will be diametrically opposite each other. Either before or after the blank 14 is formed into the tube 10, the lugs 18 are bent to the shape shown at the bottom of Fig. 1 so that they will form a partial closure at the lower end of the tube 10.

The wide end 15 of the blank 14 is provided with a plurality of perforations 19 so that, when the finished armor is in use, the fluid, whose temperature is being measured and in which the lower end of the armor and of the thermometer 12 is immersed, may have ready access to the bulb 20 of the thermometer.

The outer tube 11 is formed from a blank 21 having the shape shown in Fig. 5. The general shape of the blank 21 for the outer tube 11 is similar to that of the blank 14 for the inner tube 10, this shape consisting of a short wide portion 22 and a long somewhat narrower portion 23, the wide end of the blank being provided with a pair of longitudinally projecting lugs 24. However, both portions 22 and 23 of the blank 21 are slightly wider than the corresponding portions 15 and 16 of the blank 14 for the inner tube so that when the blank 21 is formed into a tube the resultant tube 11 will be large enough to receive the inner tube 10 within it.

As may be seen in Fig. 3, the slot 25 in the outer tube has approximately the same linear width as the slot 17 in the inner tube, but because it is a slot in a tube of greater diameter, its angular width is less. Hence, the edges 26 of the outer tube project in slightly beyond the edges of the inner tube, and they are bent in slightly, as shown in Fig. 3, to prevent the inner tube from rotating within the outer tube.

Accidental sliding of the tubes relative to each other is prevented by the fact that the inner tube 10 is a snug resilient fit within the outer tube 11. This type of fit is obtained by forming the tubes so that the inner tube is actually slightly larger in diameter than the inside of the outer tube, the difference being only one or two thousandths of an inch, and the insertion of one tube into the other is facilitated by the fact that both tubes are slotted and slit their entire length. As may be seen in Fig. 1, a narrow slit 27 extends from the end of the slot 17 in the inner tube to the partially closed end of that tube, and a similar narrow slit 28 extends from the end of the slot 25 in the outer tube to the end of that tube. The slits 27 and 28 are automatically provided when the tubes 10 and 11 are shaped, because the widths of the wide portions 15 and 22 of the blanks 14 and 21 are slightly less than the circumferences of the tubes.

The upper end of the outer tube 11 is partially closed by the lugs 24, which are bent in towards the axis of the tube and have their end portions lying flat against each other, as shown in Fig. 1. The end portions of the lugs 24 are provided with registering holes 29 through which the ring 13 passes. It will be noted that the two lugs 24 lie at an oblique angle to the axis of the tube so that they form a structure which is somewhat similar to a short gable roof. When an ordinary thermometer 12 known as a ring-top thermometer having an eye 30 at its upper end is placed within the armor 10—11, the edge of the eye will fit up into the angular space provided by the obliquely extending lugs 24 and will be held against rotation. Thus, an ordinary thermometer 12 will be held so that the graduations 31 will always be visible through the slots 17 and 20 in the armor.

While I have shown only one embodiment of my invention, it will, of course, be understood that this is done by way of example and that the invention is not limited to that embodiment but includes any construction falling within the terms of any one of the following claims.

I claim as my invention:

1. For use with a thermometer, thermometer armor adjustable in length and comprising a pair of telescoping tubes having registering longitudinal slots therein, the slots in the two tubes cooperating to render visible all of the graduations on the thermometer, the combined lengths of the slots being adjustable in proportion to the adjustability of the telescoping tubes, said tubes being formed with longitudinally slidable means for preventing relative rotation therebetween.

2. For use with a thermometer, thermometer armor adjustable in length and comprising a pair of telescoping tubes having registering longitudinal slots therein, the slots in the two tubes cooperating to render visible all of the graduations on the thermometer, the combined lengths of the slots being adjustable in proportion to the adjustability of the telescoping tubes, the edges of the slot in one tube being formed with lips projecting into the slot in the other tube to prevent relative rotation of said tubes.

3. For use with a thermometer, thermometer armor adjustable in length and comprising inner and outer telescoping tubes having registering longitudinal slots therein, the slots in the two tubes cooperating to render visible all of the graduations on the thermometer, the combined lengths of the slots being adjustable in proportion to the adjustability of the telescoping tubes, the edges of the slot in the outer tube being bent in over the edges of the slot in the inner tube to prevent rotation of one tube relative to the other.

4. For use with a thermometer, thermometer armor adjustable in length and comprising a pair of telescoping tubes having registering longitudinal slots therein, the slots in the two tubes cooperating to render visible all of the graduations on the thermometer, the combined lengths of the slots being adjustable in proportion to the adjustability of the telescoping tubes, each tube having one end at least partially closed to prevent the exit of a thermometer from that end, the slot in one tube extending to the open end thereof and the other tube being provided with lips at the edges of the slot therein and projecting into the slot in the first tube.

5. For use with a thermometer, thermometer armor adjustable in length and comprising a pair of telescoping tubes having registering slots therein, the slots in the two tubes cooperating to render visible all of the graduations on the thermometer, the combined lengths of the slots being adjustable in proportion to the adjustability of the telescoping tubes, each tube having one end at least partially closed to prevent the exit of a thermometer from that end, the slot in one tube extending to the open end thereof, the other tube being provided with lips at the edges of the slot therein and projecting into the slot in the first tube, and at least one of the tubes being split from the end of the slot to the adjacent end of the tube.

6. For use with a thermometer, thermometer armor adjustable in length and comprising inner and outer telescoping tubes, each tube being open at one end and at least partially closed at the other end to prevent the removal of a thermometer therefrom except through the open end, the inner tube having a longitudinal slot extending to its open end, and the outer tube having a longitudinal slot with lips along its edges projecting into the slot in the inner tube to prevent rotation of the tubes relative to each other, the slots in the two tubes cooperating to render visible all of the graduations on the thermometer, the combined lengths of the slots being adjustable in proportion to the adjustability of the telescoping tubes.

7. For use with a thermometer, thermometer armor adjustable in length and comprising inner and outer telescoping tubes, each tube being open at one end and at least partially closed at the other end to prevent the removal of a thermometer therefrom except through the open end, the two tubes having registering longitudinal slots cooperating to render visible all of the graduations on the thermometer, the combined lengths of the slots being adjustable in proportion to the adjustability of the telescoping tubes, the outer tube having a non-circular bore over at least a portion of its length, and the inner tube having a non-circular section engaged in said non-circular bore and preventing relative rotation of the tubes.

8. For use with a ring-top thermometer, thermometer armor adjustable in length and comprising a pair of telescoping tubes having registering longitudinal slots therein, said tubes being formed with longitudinally slidable means for preventing relative rotation therebetween, and means at one end of one of said tubes partially closing said tube and providing surfaces extending across said tube at both sides of the axis thereof and facing at least partly towards said axis, said surfaces being adapted to engage opposite sides of the eye on the end of said thermometer in said armor to prevent rotation of said thermometer.

9. In an armor for use with a thermometer having a flattened end, a tube adapted to encircle the thermometer and having a pair of oppositely disposed lugs at one end of and integral with the wall of said tube, said lugs being substantially flat in cross section and extending obliquely towards the axis of said tube and adapted to engage the flattened end of the thermometer to prevent rotation of same.

10. In an armor for use with a thermometer having a flattened end, a tube adapted to encircle the thermometer and having a pair of oppositely disposed lugs at one end of and integral with the wall of said tube, said lugs being substantially flat in cross section and extending obliquely towards the axis of said tube and having axially extending terminal portions adapted to engage the flattened end of the thermometer to prevent rotation of same, and a ring passing through holes in said terminal portions.

11. For use with a ring-top thermometer, a thermometer armor adjustable in length and comprising a pair of telescoping tubes having registering longitudinal slots therein, one of said tubes being adapted to receive the upper portion of the thermometer, each tube being open at one end, the opposite end of the tube for the top portion of the thermometer having oppositely disposed, substantially flat lugs extending obliquely toward the axis of the tube to provide a socket for receiving the ring end of the thermometer and cooperating therewith to prevent rotation of the thermometer, the outer tube having a non-circular bore over at least a portion of its length and the inner tube having a non-circular section engaging said non-circular bore and preventing relative rotation of the tubes.

JOHN LOBA McCONNELL.